(12) United States Patent
Lee et al.

(10) Patent No.: US 9,112,988 B2
(45) Date of Patent: Aug. 18, 2015

(54) TERMINAL AND METHOD OF CONTROLLING THE SAME

(75) Inventors: Seong Cheol Lee, Seoul (KR); Jin Seo, Seoul (KR); Sang Hyun Park, Columbus, OH (US)

(73) Assignee: LG ELECTRONICS INC., Seoul (KR)

( * ) Notice: Subject to any disclaimer, the term of this patent is extended or adjusted under 35 U.S.C. 154(b) by 677 days.

(21) Appl. No.: 12/325,807

(22) Filed: Dec. 1, 2008

(65) Prior Publication Data
US 2010/0131880 A1 May 27, 2010

(30) Foreign Application Priority Data
Dec. 6, 2007 (KR) ........................ 10-2007-0126147

(51) Int. Cl.
| G06F 3/048 | (2013.01) |
| H04M 1/725 | (2006.01) |
| G06F 3/0481 | (2013.01) |
| G06F 3/0488 | (2013.01) |
| H04W 52/02 | (2009.01) |

(52) U.S. Cl.
CPC ........ *H04M 1/72547* (2013.01); *G06F 3/04817* (2013.01); *G06F 3/04883* (2013.01); *H04M 1/72558* (2013.01); *H04M 2250/22* (2013.01); *H04W 52/027* (2013.01)

(58) Field of Classification Search
CPC ...................... G06F 3/04817; H04M 1/72547
USPC .......................................... 715/727, 752, 782
See application file for complete search history.

(56) References Cited

U.S. PATENT DOCUMENTS

| 5,305,435 | A | * | 4/1994 | Bronson ........................ 715/777 |
| 5,664,128 | A | * | 9/1997 | Bauer ............................ 715/708 |
| 5,745,096 | A | * | 4/1998 | Ludolph et al. ............... 715/764 |
| 5,917,493 | A | * | 6/1999 | Tan et al. ....................... 715/835 |
| 2003/0160815 | A1 | | 8/2003 | Muschetto |
| 2003/0174172 | A1 | * | 9/2003 | Conrad et al. ................ 345/781 |
| 2004/0012572 | A1 | * | 1/2004 | Sowden et al. ............... 345/173 |
| 2004/0049743 | A1 | * | 3/2004 | Bogward ....................... 715/531 |
| 2004/0165010 | A1 | * | 8/2004 | Robertson et al. ............ 345/805 |
| 2004/0215732 | A1 | * | 10/2004 | McKee et al. ................. 709/207 |
| 2005/0024341 | A1 | * | 2/2005 | Gillespie et al. .............. 345/173 |
| 2006/0238517 | A1 | * | 10/2006 | King et al. .................... 345/173 |
| 2007/0191070 | A1 | * | 8/2007 | Rao ............................... 455/566 |
| 2007/0192747 | A1 | * | 8/2007 | Phelan et al. ................. 715/847 |
| 2007/0265031 | A1 | * | 11/2007 | Koizumi et al. ........... 455/556.1 |

(Continued)

FOREIGN PATENT DOCUMENTS

| CN | 101059744 A | 10/2007 |
| DE | 10 2007 016 057 A1 | 11/2007 |

(Continued)

*Primary Examiner* — Anil Bhargava
(74) *Attorney, Agent, or Firm* — Birch, Stewart, Kolasch & Birch, LLP

(57) ABSTRACT

According to an embodiment, a terminal and a method of displaying menu icons thereof are discussed, by which a terminal user is facilitated to input various commands. An embodiment of the present invention includes a touch screen and a control unit configured to control at least one touch-available icon to move between outer and inner areas of an image displayed on the touch screen in a direction of a touch-drag on the touch screen. Accordingly, the electric current for detecting a touch is supplied to the touch screen only if the touch-available icon is displayed on the touch screen. Hence, the present invention minimizes power consumption in using the touch screen.

28 Claims, 11 Drawing Sheets

(56) References Cited

U.S. PATENT DOCUMENTS

2008/0094369 A1* 4/2008 Ganatra et al. ................ 345/173
2008/0094371 A1* 4/2008 Forstall et al. ................ 345/173
2009/0058822 A1* 3/2009 Chaudhri ..................... 345/173

FOREIGN PATENT DOCUMENTS

| EP | 1 768 364 A2 | 3/2007 |
| JP | 2003-195998 A | 7/2003 |
| WO | WO 2007/134081 A2 | 11/2007 |

* cited by examiner (8-1)

(8-2)

(8-3)

(8-4)

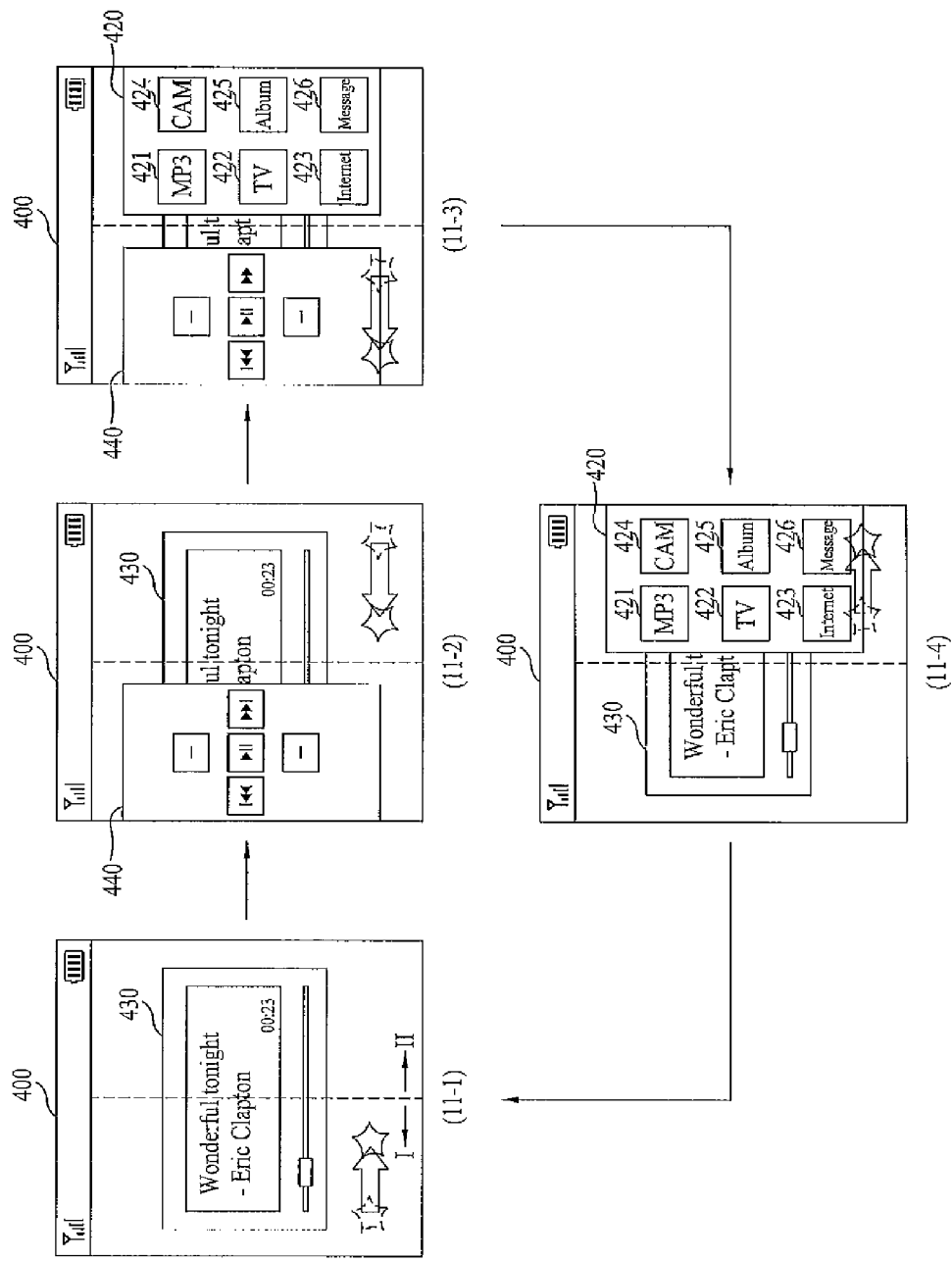

TERMINAL AND METHOD OF CONTROLLING THE SAME

This application claims the priority benefit of the Korean Patent Application No. 10-2007-0126147, filed on Dec. 6, 2007, which is hereby incorporated by reference as if fully set forth herein.

BACKGROUND OF THE INVENTION

1. Field of the Invention

The present invention relates to a terminal and a method of controlling the same, and more particularly, to a terminal and a method of displaying menu icons thereof. Although the present invention is suitable for a wide scope of applications, it is particularly suitable for facilitating a user to input various commands to the terminal.

2. Discussion of the Related Art

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal.

When a terminal operates as a multimedia device capable of performing the above-described various functions, various menu icons are displayed on the display screen of the terminal as various as the functions. The various menu icons, however, hinders a user's convenience for terminal manipulations and may cause confusions to the user. So, efforts have been made to configure and arrange the various menu icons to facilitate users' manipulations.

SUMMARY OF THE INVENTION

Accordingly, the present invention is directed to a terminal and a method of controlling the same that substantially obviate one or more problems due to limitations and disadvantages of the related art.

An object of the present invention is to provide a terminal and a method of displaying menu icons thereof, by which a terminal user is facilitated to identify and select a specific one of various menu icons displayed on a display screen of the terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a terminal according to an embodiment of the present invention includes a touch screen, and a control unit configured to control at least one touch-available icon to move between outer and inner areas of an image displayed on the touch screen in a direction of a touch-drag on the touch screen.

In another aspect of the present invention, a method of displaying menu icons in a terminal, includes performing a touch-drag in a prescribed direction on a touch screen of the terminal, and moving at least one touch-available icon between outer and inner areas of an image displayed on the touch screen in a direction of the touch-drag.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 11 is a diagram of examples of a display screen of a mobile terminal to describe an image displaying method according to a sixth embodiment of the present invention.

DETAILED DESCRIPTION OF THE PREFERRED EMBODIMENTS

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

In the following description, suffixes 'module', 'unit' and 'part' for elements are given to facilitate the preparation of this disclosure only. So, significant meanings or roles are not given to the suffixes themselves. Hence, it is understood that the 'module', 'unit' and 'part' can be used together or separately.

Figure 1:
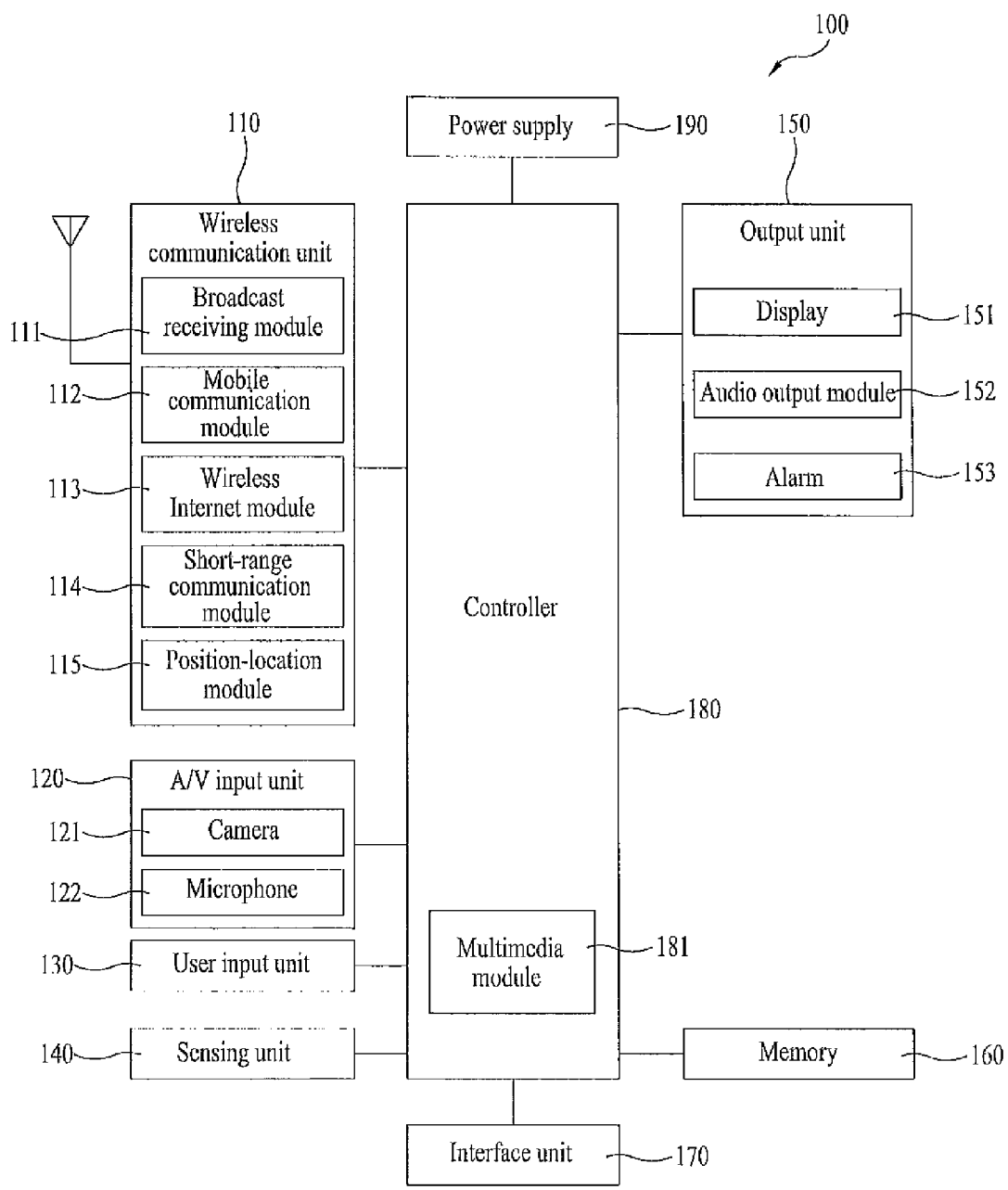
FIG. 1 is a block diagram of a mobile terminal in accordance with an embodiment of the present invention.

FIG. 1 is a block diagram of a mobile terminal 100 in accordance with an embodiment of the present invention. The mobile terminal may be implemented using a variety of different types of terminals. Examples of such terminals include mobile as well as non-mobile terminals, such as mobile phones, user equipment, smart phones, computers, digital broadcast terminals, personal digital assistants, portable multimedia players (PMP), navigators, etc. By way of non-limiting examples only, further description will be with regard to a mobile terminal. However, teachings of the present invention apply equally to other types of terminals such as non-mobile terminals, and the present invention encompasses both mobile terminals and non-mobile terminals. FIG. 1 shows the mobile terminal 100 having various components, but it is understood that implementing all of the illustrated components is not a requirement. Greater or fewer components may alternatively be implemented.

FIG. 1 shows an example of a wireless communication unit 110 configured with several commonly implemented components. For instance, the wireless communication unit 110 typically includes one or more components which permit wireless communication between the mobile terminal 100 and a wireless communication system or network within which the mobile terminal is located or visiting.

Particularly, a broadcast receiving module 111 receives a broadcast signal and/or broadcast associated information (e.g., broadcast data, etc.) from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and/or an electronic service guide (ESG) of digital video broadcast-handheld (DVB-H).

The broadcast signal may be implemented as a TV broadcast signal, a radio broadcast signal, and/or a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By non-limiting example, such broadcasting systems include, but are not limited to, digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals by the terminal 100 is also possible. If desired, data received by the broadcast receiving module 111 may be stored in a suitable device, such as memory 160.

A mobile communication module 112 transmits/receives wireless signals to/from one or more network entities (e.g., base station, Node-B). Such signals may represent audio, video, multimedia, control signaling, and data, among others.

A wireless internet module 113 supports Internet access for the mobile terminal 100. This module may be internally or externally coupled to the terminal 100. Suitable technologies for wireless internet may include, but are not limited to, WLAN (Wireless LAN) (Wi-Fi), Wibro (Wireless broadband), Wimax (World Interoperability for Microwave Access), HSDPA (High Speed Downlink Packet Access).

A short-range communication module 114 facilitates relatively short-range communications. Suitable technologies for short-range communication my include, but are not limited to, radio frequency identification (RFID), infrared data association (IrDA), ultra-wideband (UWB), as well at the networking technologies commonly referred to as Bluetooth and ZigBee, to name a few.

A position-location module 115 identifies or otherwise obtains the location of the mobile terminal 100. If desired, this module may be implemented using global positioning system (GPS) components which cooperate with associated satellites, network components, and combinations thereof.

An audio/video (A/V) input unit 120 is configured to provide audio or video signals input to the mobile terminal 100. As shown in the example, the A/V input unit 120 includes a camera 121 and a microphone 122. The camera 121 receives and processes image frames of still pictures or video.

The microphone 122 receives an external audio signal while the portable device (e.g., A/V input unit 120) is in a particular mode, such as phone call mode, recording mode and voice recognition. This audio signal is processed and converted into digital data. The portable device (e.g., A/V input unit 120) can include assorted noise removing algorithms to remove noise generated in the course of receiving the external audio signal. Data generated by the A/V input unit 120 may be stored in the memory 160, utilized by an output unit 150, or transmitted via one or more modules of the communication unit 110. If desired, two or more microphones and/or cameras may be used.

A user input unit 130 generates input data responsive to a user's manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display (which will be described in more detail below).

A sensing unit 140 provides status measurements of various aspects of the mobile terminal 100. For instance, the sensing unit 140 may detect an open/close status of the mobile terminal, relative positioning of components (e.g., a display and keypad) of the mobile terminal, a change in the position of the mobile terminal or a component of the mobile terminal, a presence or absence of user contact with the mobile terminal, orientation or acceleration/deceleration of the mobile terminal. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by a power supply 190, the presence or absence of a coupling or other connection between an interface unit 170 and an external device.

The interface unit 170 is often implemented to couple the mobile terminal 100 with external device(s). Examples of the external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM)

card, user identity module (UIM) card, removable user identity module (RUIM) card), audio input/output ports and video input/output ports.

The output unit 150 generally includes various components which support the output needs or requirements of the mobile terminal 100. A display 151 is generally implemented to visually display information associated with the mobile terminal 100. For instance, if the mobile terminal is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

One particular implementation of the display 151 is to provide it as a touch screen working in cooperation with an input device (e.g., the input unit 130), such as a touchpad. This configuration permits the display 151 to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal may include one or more of such displays. An example of a two-display embodiment is one in which one display is configured as an internal display (viewable when the terminal is in an opened position) and a second display configured as an external display (viewable in both the open and closed positions).

The output unit 150 further includes an audio output module 152 which supports the audio output needs or requirements of the mobile terminal 100. The audio output module 152 can be implemented using one or more speakers, buzzers, other audio producing devices, and combinations thereof. The audio output module 152 functions in various modes including, e.g., call-receiving mode, call-placing mode, recording mode, voice recognition mode and broadcast reception mode. During the operation, the audio output module 152 outputs audio relating to a particular function (e.g., call received, message received, and errors).

The output unit 150 further includes an alarm 153, which is commonly used to signal or otherwise identify the occurrence of a particular event associated with the mobile terminal. Typical events include call received, message received, user input received, etc. An example of such output includes providing tactile sensations (e.g., vibration) to a user. For instance, the alarm 153 may be configured to vibrate responsive to the mobile terminal 100 receiving a call or message. As another example, vibration is provided by the alarm 153 responsive to receiving a user input at the mobile terminal, thus providing a tactile feedback mechanism. It is understood that the various outputs provided by the components of the output unit 150 may be separately performed, or such output may be performed using any combination of such components.

The memory 160 is preferably used to store various types of data to support the processing, control, and storage needs or requirements of the mobile terminal 100. Examples of such data can include program instructions for applications operating on the mobile terminal, contact data, phonebook data, messages, pictures, video, etc. The memory 160 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

A controller 180 preferably controls the overall operations of the mobile terminal 100. For instance, the controller 180 performs the control and processing associated with voice calls, data communications, instant message communication, video calls, camera operations and recording/reproduction operations. If desired, the controller 180 may include a multimedia module 181 which provides multimedia playback. The multimedia module 181 may be configured as part of the controller 180, or may be implemented as a separate component.

The power supply 190 provides power needed by the various components of the mobile terminal 100. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments can be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

The mobile terminal 100 may be implemented in a variety of different configurations. Examples of such configurations include, but are not limited to, folder-type, slide-type, bar-type, rotational-type, swing-type, or combinations thereof. For clarity, further disclosure will primarily relate to a slide-type mobile terminal. However such teachings of the present invention apply equally to other types of terminals.

Figure 2:
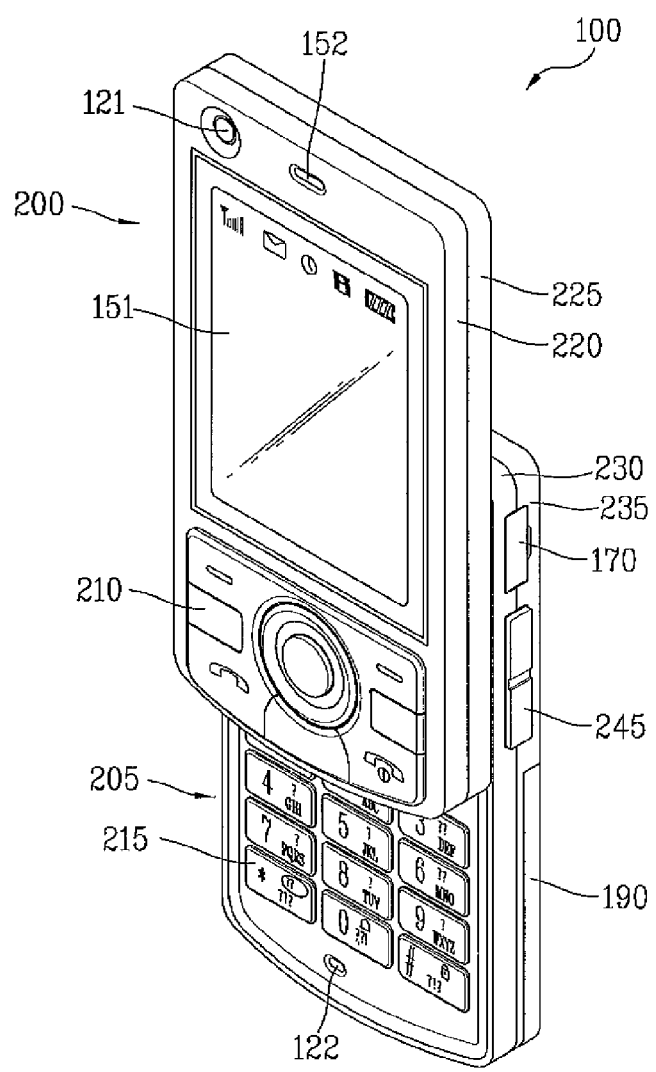
FIG. 2 is a perspective view of a front side of one example of a mobile terminal according to an embodiment of the present invention.

FIG. 2 is a perspective view of a front side of one example of a mobile terminal 100 according to an embodiment of the present invention. The terminal 100 of FIG. 2 can include all or some of the components of the terminal shown in FIG. 1.

Referring to FIG. 2, the mobile terminal 100 is shown having a first body 200 configured to slidably cooperate with a second body 205. The user input unit (described in FIG. 1, e.g., component 130) may include a first input unit such as touchpad and function keys 210, a second input unit such as a keypad 215 and a third input unit such as side keys 245. The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal.

The first body 200 slides relative to the second body 205 between open and closed positions. In a closed position, the first body 200 is positioned over the second body 205 in such a manner that the keypad 215 is substantially or completely obscured by the first body 200. In the open position, user access to the keypad 215, as well as the display 151 and function keys 210, is possible. The function keys 210 are convenient to a user for entering commands such as start, stop and scroll.

The mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. This mode configuration may be changed as required or desired.

The first body 200 is shown to be formed from a first case 220 and a second case 225, and the second body 205 is shown to be formed from a first case 230 and a second case 235. These first and second cases are usually formed from a suitably ridge material such as injection molded plastic, or formed using metallic material such as stainless steel (STS) and titanium (Ti).

If desired, one or more intermediate cases may be provided between the first and second cases of one or both of the first and second bodies 200, 205. The first and second bodies 200, 205 are sized to receive electronic components for supporting the operations of the mobile terminal 100.

The first body 200 is shown as having a camera 121 and an audio output unit 152, which is configured as a speaker, positioned relative to a display 151. If desired, the camera 121 may be constructed in such a manner that it can be selectively positioned (e.g., rotated, swiveled, etc.) relative to the first body 200.

The function keys 210 are positioned adjacent to a lower side of the display 151. The display 151 is implemented as an LCD or OLED. Recall that the display may also be configured as a touch screen having an underlying touch pad which generates signals responsive to user contact (e.g., finger, stylus, etc.) with the touch screen.

The second body 205 is shown as having a microphone 122 positioned adjacent to the keypad 215, and the side keys 245, which are one type of a user input unit, positioned along the side of the second body 205. Preferably, the side keys 245 may be configured as hot keys, such that the side keys are associated with a particular function of the mobile terminal. An interface unit 170 is positioned adjacent to the side keys 245, and a power supply 190 in a form of a battery is located on a lower portion of the second body 205.

Figure 3:
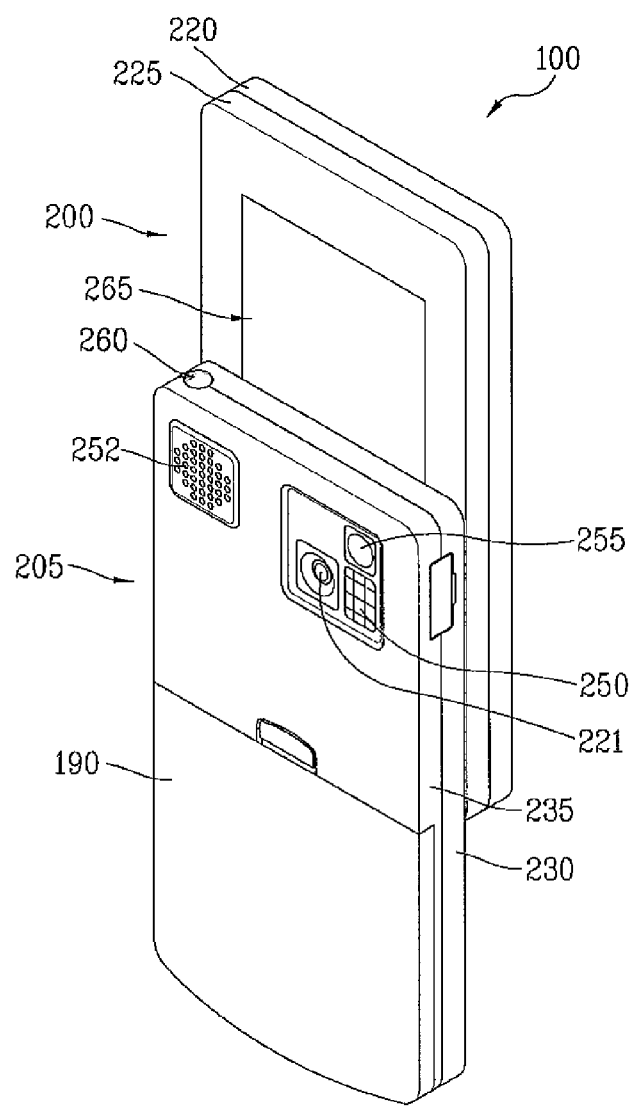
FIG. 3 is a rear view of one example of the mobile terminal shown in FIG. 2.

FIG. 3 is a rear view of the mobile terminal shown in FIG. 2. FIG. 3 shows the second body 205 having a camera 221, and an associated flash 250 and mirror 255. The flash 250 operates in conjunction with the camera 221 of the second body 205. The mirror 255 is useful for assisting a user to position the camera 221 in a self-portrait mode. The camera 221 of the second body faces a direction which is opposite to a direction faced by the camera 121 of the first body 200 (FIG. 2). Each of the cameras 121 and 221 of the first and second bodies may have the same or different capabilities.

In an embodiment, the camera 121 of the first body 200 operates with a relatively lower resolution than the camera 221 of the second body 205. Such an arrangement works well during a video conference, for example, in which reverse link bandwidth capabilities may be limited. The relatively higher resolution of the camera 221 of the second body 205 (FIG. 3) is useful for obtaining higher quality pictures for later use or for communicating to others.

The second body 205 also includes an audio output module 252 configured as a speaker, and which is located on an upper side of the second body. If desired, the audio output modules 152 and 252 of the first and second bodies 200, 205, may cooperate to provide stereo output. Moreover, either or both of these audio output modules 152 and 252 may be configured to operate as a speakerphone. All the components of the second body 205 as shown in FIG. 3 are controlled by the controller 180 and operatively coupled in the mobile terminal 100.

A broadcast signal receiving antenna 260 is shown to be located at an upper end of the second body 205. The antenna 260 functions in cooperation with the broadcast receiving module 111 (FIG. 1). If desired, the antenna 260 may be fixed or configured to retract into the second body 205. The rear side of the first body 200 includes a slide module 265, which slideably couples with a corresponding slide module located on the front side of the second body 205.

It is understood that the illustrated arrangement of the various components of the first and second bodies 200, 205, may be modified as required or desired. In general, some or all of the components of one body may alternatively be implemented on the other body. In addition, the location and relative positioning of such components are not critical to many embodiments, and as such, the components may be positioned at locations which differ from those shown by the representative figures.

The mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, but are not limited to, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
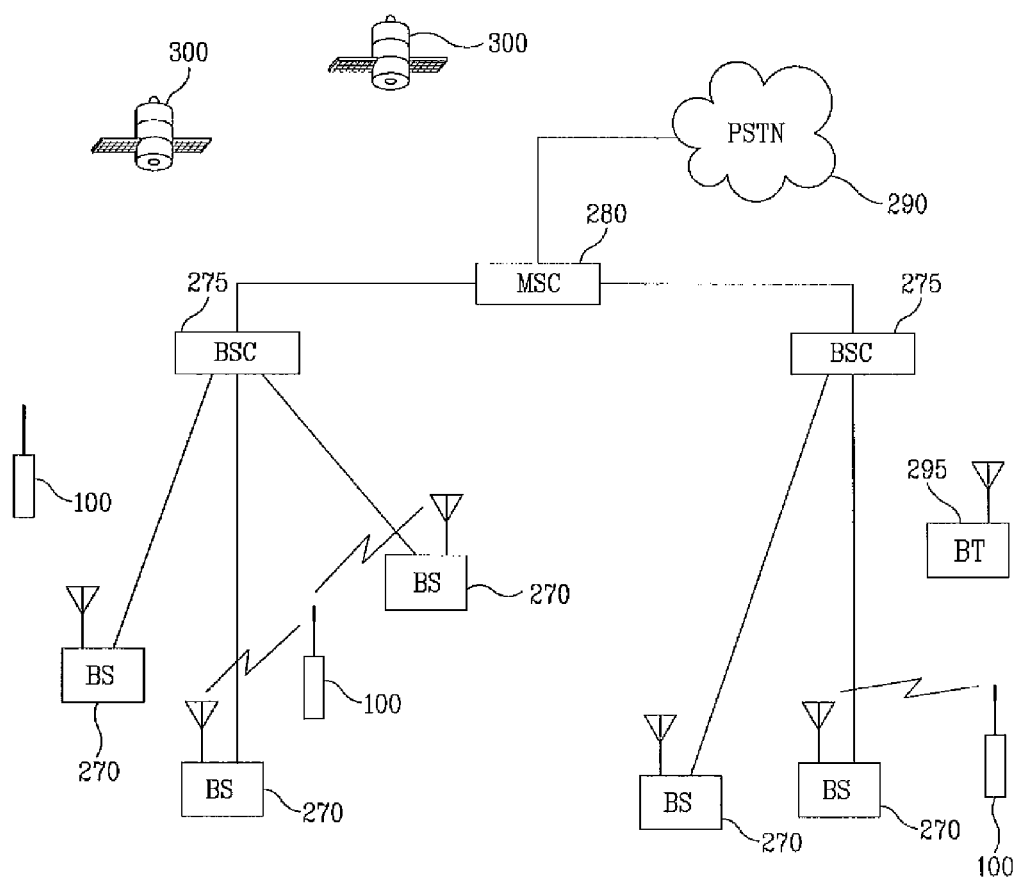
FIG. 4 is a block diagram of a CDMA wireless communication system operable with the mobile terminal of FIGS. 1 to 3.

Referring now to FIG. 4, a CDMA wireless communication system is shown having a plurality of mobile terminals 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of known interfaces including, for example, E1/T1, ATM, IP, PPP, Frame Relay, HDSL, ADSL, or xDSL. It is to be understood that the system may include more than two BSCs 275. All components of the system are operatively coupled and configured.

Each base station 270 may include one or more sectors, each sector having an omnidirectional antenna or an antenna pointed in a particular direction radially away from the corresponding base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 (or other type of digital broadcast transmitter) is shown broadcasting to portable terminals 100 operating within the system. The broadcast receiving module 111 (FIG. 1) of the terminal 100 is preferably configured to receive broadcast signals transmitted by the DMB transmitter 295. Similar arrangements may be implemented for other types of broadcast and multicast signaling (as discussed above).

FIG. 4 further depicts several global positioning system (GPS) satellites 300. Such satellites facilitate locating the position of some or all of the portable terminals 100. Two satellites are depicted, but it is understood that useful positioning information may be obtained with greater or fewer satellites. The position-location module 115 (FIG. 1) of the portable terminal 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During an operation of the wireless communication system, the base stations 270 receive sets of reverse-link signals from various mobile terminals 100. The mobile terminals 100 are engaging in calls, messaging, and other communications. Each reverse-link signal received by a given base station 270 is processed within that base station. The resulting data is forwarded to an associated BSC 275. The BSC 275 provides call resource allocation and mobility management functionality including the orchestration of soft handoffs between base stations 270. The BSCs 275 also route the received data to the MSC 280, which provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

In the following description, various embodiments for a menu icon displaying method implemented in the above-configured mobile terminal are explained with reference to the accompanying drawings such as FIGS. 5-11. In other words, the following description is made on the assumption that the display module 151 includes a touch screen. The touch screen is indicated in the following description by a reference number 400. However, the following embodiments can be implemented in other types of communication terminals.

First Embodiment

A menu icon displaying method according to a first embodiment of the present invention is explained with reference to FIG. 5 and FIG. 6 as follows.

Figure 5:
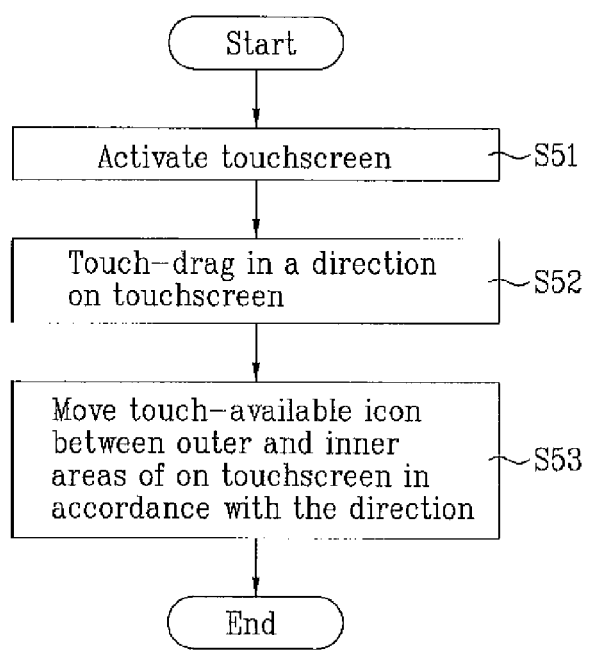
FIG. 5 is a flowchart for a method of displaying menu icons according to the present invention.
Figure 6:
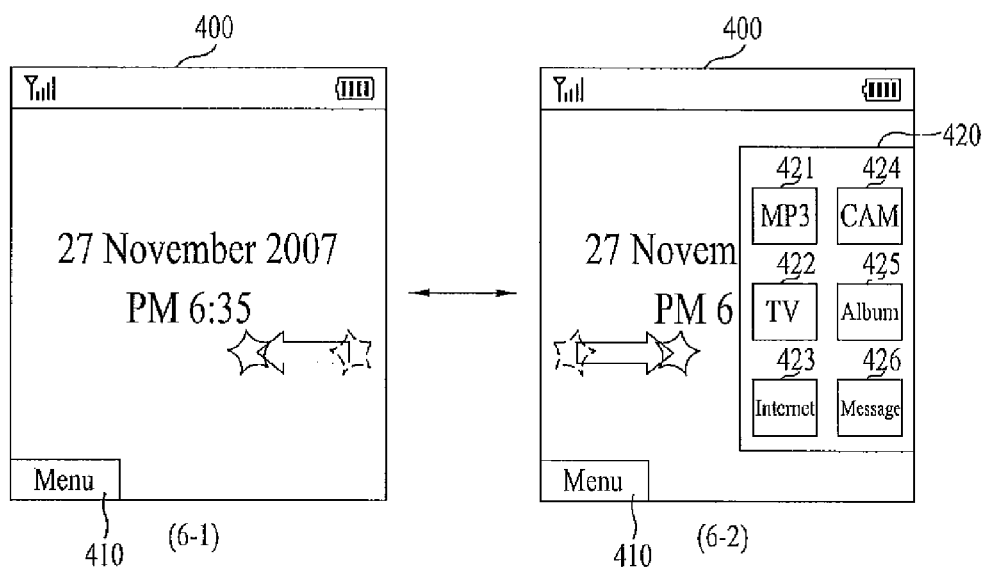
FIG. 6 is a diagram of examples of a display screen of a mobile terminal to describe an image displaying method according to a first embodiment of the present invention.

FIG. 5 is a flowchart for explaining a method of displaying menu icons according to the present invention, and FIG. 6 is a diagram of examples of a display screen of a mobile terminal to describe an image displaying method according to a first embodiment of the present invention.

First of all, a plurality of menus of the present invention can be mainly classified into two types, i.e., menus selectable by a touch on the touch screen (hereinafter named 'touch-available menus') and other menus non-selectable by the touch (hereinafter named 'touch-unavailable menus'). They will be described in detail with various examples.

Referring to (6-1) of FIG. 6, the touch screen 400 displays a standby image. And, a 'menu' icon 410 is presented in the standby image. The 'menu' icon 410 can be selected via the user input unit 130 such as a keypad. Yet, the 'menu' icon 410 may not be selectable by touching a prescribed portion of the touch screen 400. So, the 'menu' icon 410 corresponds to a touch-unavailable icon.

It is apparent to those skilled in the art that the 'menu' icon 410 can be selected via the user input unit 130 (e.g., soft key). So, its details will be omitted in this disclosure for clarity and convenience of description.

Initially, any touch-available icon is not displayed on the touch screen 400 as shown in (6-1) of FIG. 6. Hence at this time, the touch screen does not need to be activated. Thus a current supply thereto to detect a touch made by a terminal user is unnecessary and can be saved.

Under this circumstance, a touch screen activating key (not shown in FIG. 6) provided to the user input unit 130 is pressed by a terminal user. Alternatively, the touch screen activating key can be configured with a side key of the third user input unit 245. If so, the touch screen 400 is activated to detect a touch made by the terminal user [S51].

Subsequently, a prescribed point of an image displayed on the touch screen 400 (currently activated to detect a touch), as shown in (6-1) of FIG. 6 with an arrow and a star, is touched by the user (e.g., user's finger) and then dragged right to left (or in any other designated direction) [S52]. In the following description, this action is represented as an expression that a prescribed point of the touch screen 400 is touch-dragged right to left. And, it is to be understood that the 'touch-drag' is a concept including 'flick'.

Then, referring to (6-2) of FIG. 6, a group of touch-available icons 420 appear on the right side of the touch screen 400 by sliding into the touch screen 400 from the right end side of the touch screen 400 [S53]. However, the touch-available icons 420 can be configured to appear on any designated area on the touch screen 400, as desired.

Hence, the terminal user touches to select a specific touch-available icon from the group of the touch-available icons 420 displayed on the touch screen 400, to execute a function corresponding to the selected icon.

For clarity of description, the following concepts are introduced.

First of all, the touch screen 400 is preferably constructed with four sides (i.e., right side, left side, upper side and lower side). In the following description, an inner part enclosed with the four sides (i.e., a real part visible to a terminal user) is named an 'inner area' of the touch screen 400) and an outer part outside the four sides (i.e., a virtual part not viewed by a terminal user) is named an 'outer area'(hidden area) of the touch screen.

Namely, the above description that the group of touch-available icons 420 appear by sliding into the touch screen 400 from the right side of the touch screen 400 regarding (6-2) of FIG. 6 can be represented as a group of the touch-available icons located in the outer area beyond the right side slides into the inner area by crossing a boundary between the outer and inner areas at the right side of the touch screen 400.

Once the touch-available icons 420 are displayed on the touch screen 400, a prescribed point of the touch screen 400, as shown in (6-2) of FIG. 6, can be touch-dragged left to right [S52]. If so, the group of touch-available icons 420 currently displayed on the touch screen 400 slide to disappear into the right side. In other words, the group of touch-available icons 420 displayed on the inner area slides to pass through the boundary of the right side and then moves away into the outer area beyond the right side, whereby the touch-available icons 420 are no longer visible to the user on the touch screen 400 [S53].

In another example, to make the touch-available icons disappear, it is unnecessary for the touch-drag to be carried out in a direction opposite to the former direction by which the touch-available icons appeared on the touch screen. For instance, in case that the touch-drag is performed in a direction in which the touch-available icons has slid to appear, it can be configured that the touch-available icons 420 slide to move into the outer area into the left side by passing through a boundary at the left side of the touch screen.

Optionally, even if a prescribed point of the touch screen 400 is not touch-dragged, it is able to configure the touch-available icons 420 to disappear when the touch screen is deactivated by a manipulation of the touch screen activating key.

In the above description, a mechanism for the appearance/disappearance of the touch-available icons on the touch screen of the display unit after the activation of the touch screen has been explained according to an embodiment of the invention. The present invention is also applicable to the configuration for omitting the touch screen activating process owing to the touch screen that is always activated.

In the above description, a group of the touch-available icons (e.g., touch-available icons corresponding to menus frequently used by a terminal user) are configured to move across one side (e.g., right side) of the touch screen 400 only. Optionally, the present invention can be configured to enable another group of touch-available icons (e.g., touch-available icons corresponding to terminal setting relevant menus) to further move across another side of the touch screen 400. Other variations are possible.

Second Embodiment

In the description of the first embodiment of the present invention, the process for the touch-available icons to move between the inner and outer areas of the touch screen is explained. In the following description of a second embodiment of the present invention, a process for selecting at least one of touch-available icons in displaying the touch-available icons on the inner area of the touch screen is explained.

Figure 7:
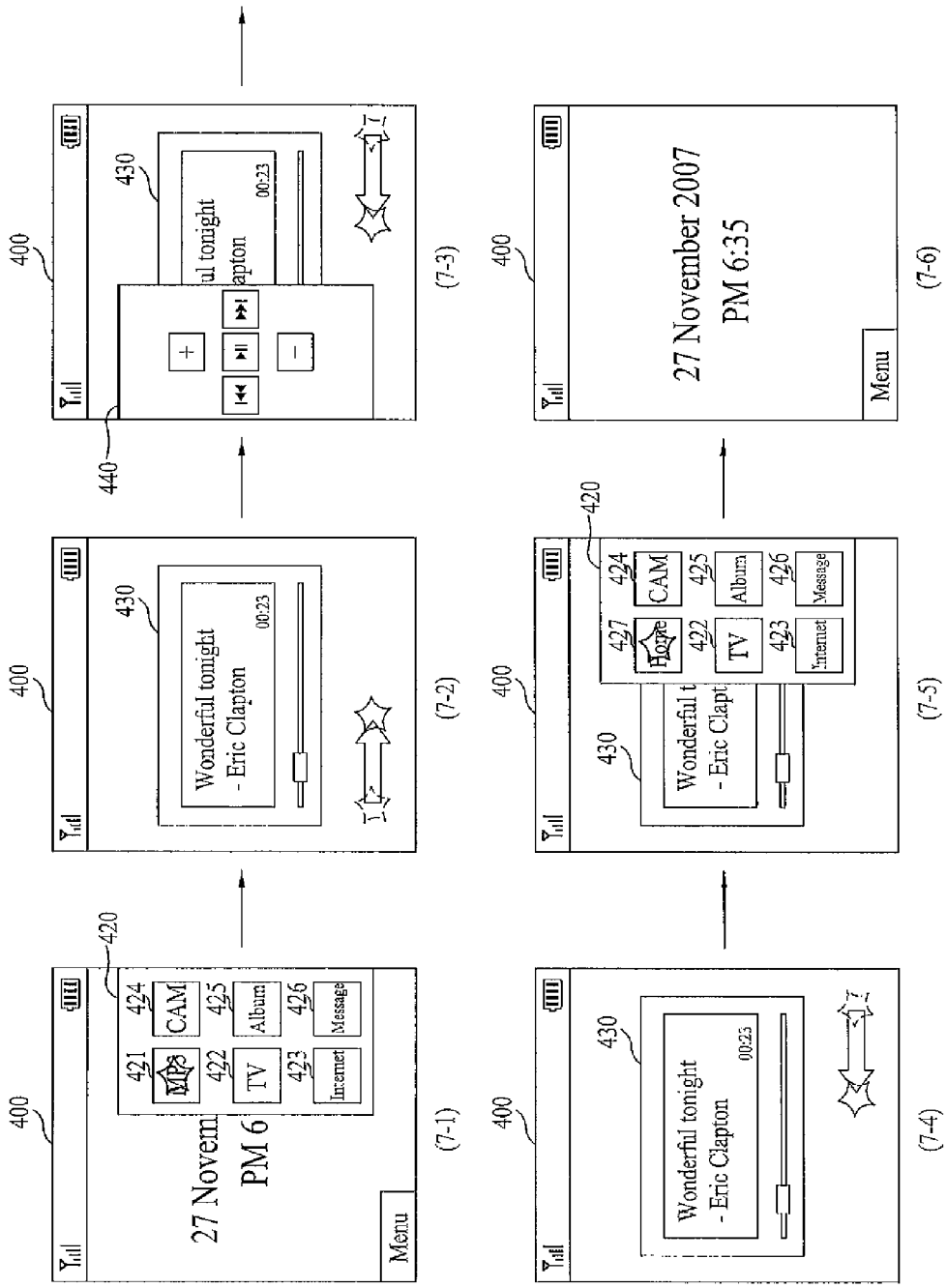
FIG. 7 is a diagram of examples of a display screen of a mobile terminal to describe an image displaying method according to a second embodiment of the present invention.

FIG. 7 is a diagram of examples of a display screen of a mobile terminal to describe an image displaying method according to a second embodiment of the present invention.

Referring to (7-1) of FIG. 7, a group of touch-available icons 420 are displayed on the touch screen 400. Since the touch-available icons 420 are displayed, it is apparent that the touch screen is in an active mode.

Let's assume that 'MP3' icon 421 is selected from the group of touch-available icons 420 that are displayed, for example.

If so, a window 430 for playing back an MP3 file, as shown in (7-2) of FIG. 7, is displayed on the touch screen 400 and an MP3 file playing function is activated in the mobile terminal 100. Here, the window 430 can display a menu for selecting a particular MP3 file and/or controlling a playback operation of an MP3 file, or a particular MP3 file can be pre-selected.

Subsequently, a prescribed point of the touch screen 400, as shown in (7-2) of FIG. 7, is touch-dragged left to right.

If so, a different group of touch-available icons 440 slide in to appear into the touchscreen 400 from the left side of the touch screen 400. In other words, a different group of touch-available icons 440 existing in the outer area beyond the left side move through a boundary (between the inner and outer areas) at the left side and then appear on the left side of the touch screen as they slide into the left side of the touch screen.

The touch-available icons 440 belonging to the different group can include icons relevant to the MP3 file playing function. Hence, a terminal user is able to control the MP3 file playing function by selecting (e.g., touching) a specific icon from the group of touch-available icons 440 currently displayed on the touch screen 400.

Referring to (7-3) of FIG. 7, a prescribed point of the touch screen 400 is touch-dragged right to left.

Then, referring to (7-4) of FIG. 7, the different group of touch-available icons 440 currently displayed on the left side of the touch screen 400 slide into the left side of the touch screen 400 and disappear, whereby the touch-available icons 440 are no longer visible on the touch screen 400. In other words, the touch-available icons 440 on the inner (visible) area of the touch screen 400 move and slide through the boundary at the left to disappear into the outer area beyond the left side of the touch screen 400.

A case of interrupting the MP3 playing function is explained as follows.

Referring to (7-4) of FIG. 4, a prescribed point of the touch screen 400 is touch-dragged right to left. Then referring to (7-5) of FIG. 4, a group of touch-available icons 420 slide in to appear into the touch screen 400 across the right side of the touch screen 400. In other words, the group of touch-available icons 420 existing in the outer area (hidden area) beyond the right side pass through the boundary at the right side and then slide to move into the inner area, whereby the touch-available icons 420 slidably appear on the right side of the touch screen 400.

In this case, the 'MP3' icon 421 is replaced by a 'Home' icon 427 among the group of the touch-available icons 420. Since the MP3 file playing function is in progress (e.g., the MP3 file is being played back), the 'MP3' icon 421 is not needed at this moment so another icon can appear with other touch-available icons. In another example, a different combination of touch-available icons 420 may appear on the touch screen. Further, a number of touch-available icons 420 as well as the manner in which the touch-available icons 420 appear on the touch screen 400 can be controlled/selected by the user, if desired.

As an example, the 'Home' icon 427 is selected by the terminal user.

Then, referring to (7-6) of FIG. 7, the mobile terminal 100 interrupts the MP3 file playing function (e.g., the MP3 file playing is stopped) and a standby image is displayed on the touch screen 400. In other examples, the user can touch-select any of the displayed touch-available icons 420 to carry out a desired function.

Third Embodiment

While a specific function (e.g., MP3 file playing function) described in the second embodiment of the present invention is being executed, if such an event as a message reception takes place, how to process the event is explained as a third embodiment of the present invention with reference to FIG. 8 as follows.

Figure 8:
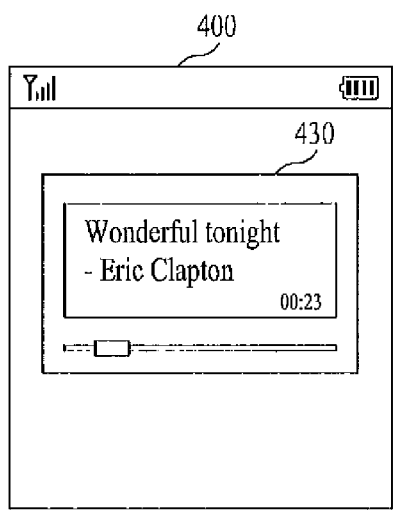
FIG. 8 is a diagram of examples of a display screen of a mobile terminal to describe an image displaying method according to a third embodiment of the present invention.
Figure 8:
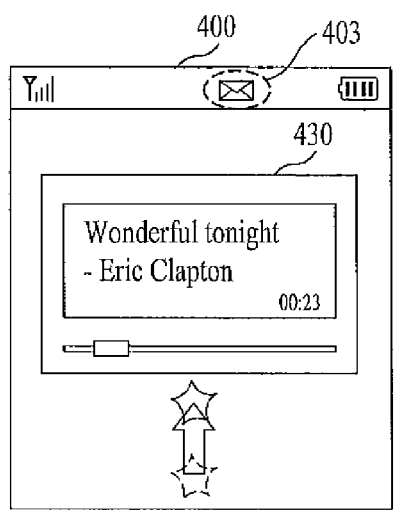
Figure 8:
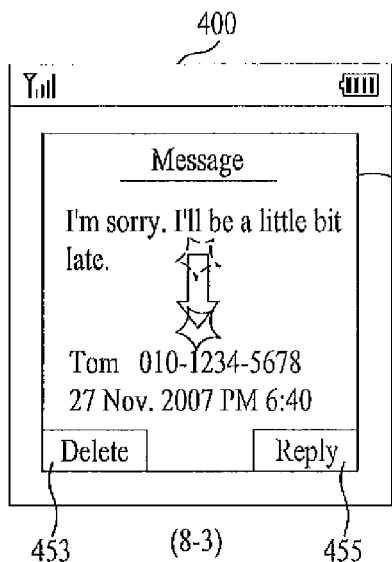
Figure 8:
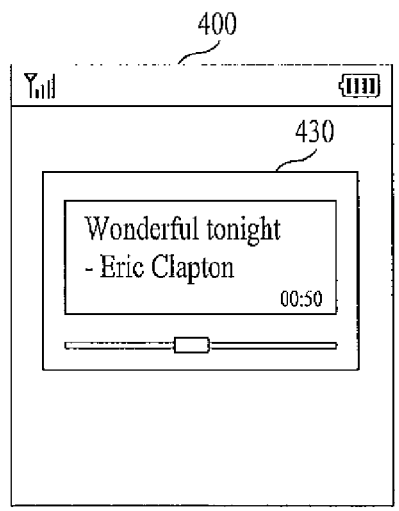

FIG. 8 is a diagram of examples of a display screen of a mobile terminal to describe an image displaying method according to a third embodiment of the present invention.

Referring to (8-1) of FIG. 8, it is assumed that an MP3 file playing function is being executed in the mobile terminal 100. For example, a particular MP3 file (audio and/or video) is currently being played in the mobile terminal 100

During this time, assume that the mobile terminal 100 receives a message.

If so, an indicator 403 indicating the message reception, as shown in (8-2) of FIG. 8, is displayed on the touch screen 400.

If the touch screen 400 is not in a touch-active mode, the touch screen activating key is selected to activate the touch screen so that, e.g., a touch to the touch screen can be detected.

Referring to (8-2) of FIG. 8, a prescribed point of the touch screen 400 is touch-dragged upward.

Then referring to (8-3) of FIG. 8, a window 450 for the received message slides in to appear into the touchscreen 400 across the lower side of the touch screen 400. In other words, the window 450 existing on the outer area (hidden area of the touch screen 400) beyond the lower side of the touch screen 400 pass through a boundary at the lower side and then slide in to move into the inner area of the touch screen 400. That is, the window 450 slidably appears on the touch screen 400 from the lower side of the touch screen 400.

A terminal user deletes the received message by touching a 'Delete' icon 453 within the window 450 or makes a reply in response to the received message by touching a 'Reply' icon 455 within the window 450.

Subsequently referring to (8-3) of FIG. 8, a prescribed point of the touch screen 400 is touch-dragged downward.

Then referring to (8-4) of FIG. 8, the window 450 for the received message slides downward to disappear into the lower side of the touch screen 400 from the inner area of the touch screen 400. In other words, the window 450 existing within the inner area of the touch screen passes through the boundary at the lower side and then slides out to disappear into the outer area (hidden area) beyond the lower side of the touch screen 400. As a result, the window 430 may be visible to the user.

Fourth Embodiment

In the above description, when the touch screen is touch-dragged once, a group of touch-available icons simultaneously slidably appear onto the inner area of the touch screen. Alternatively, the following configuration is possible. In other words, after some of the group of touch-available icons have slid to appear onto the inner area of the touch screen, if the touch screen is touch-dragged one more time, the rest of the group of touch-available icons slide to appear onto the inner area of the touchscreen. This configuration is explained as a fourth embodiment of the present invention with reference to FIG. 9 as follows.

Figure 9:
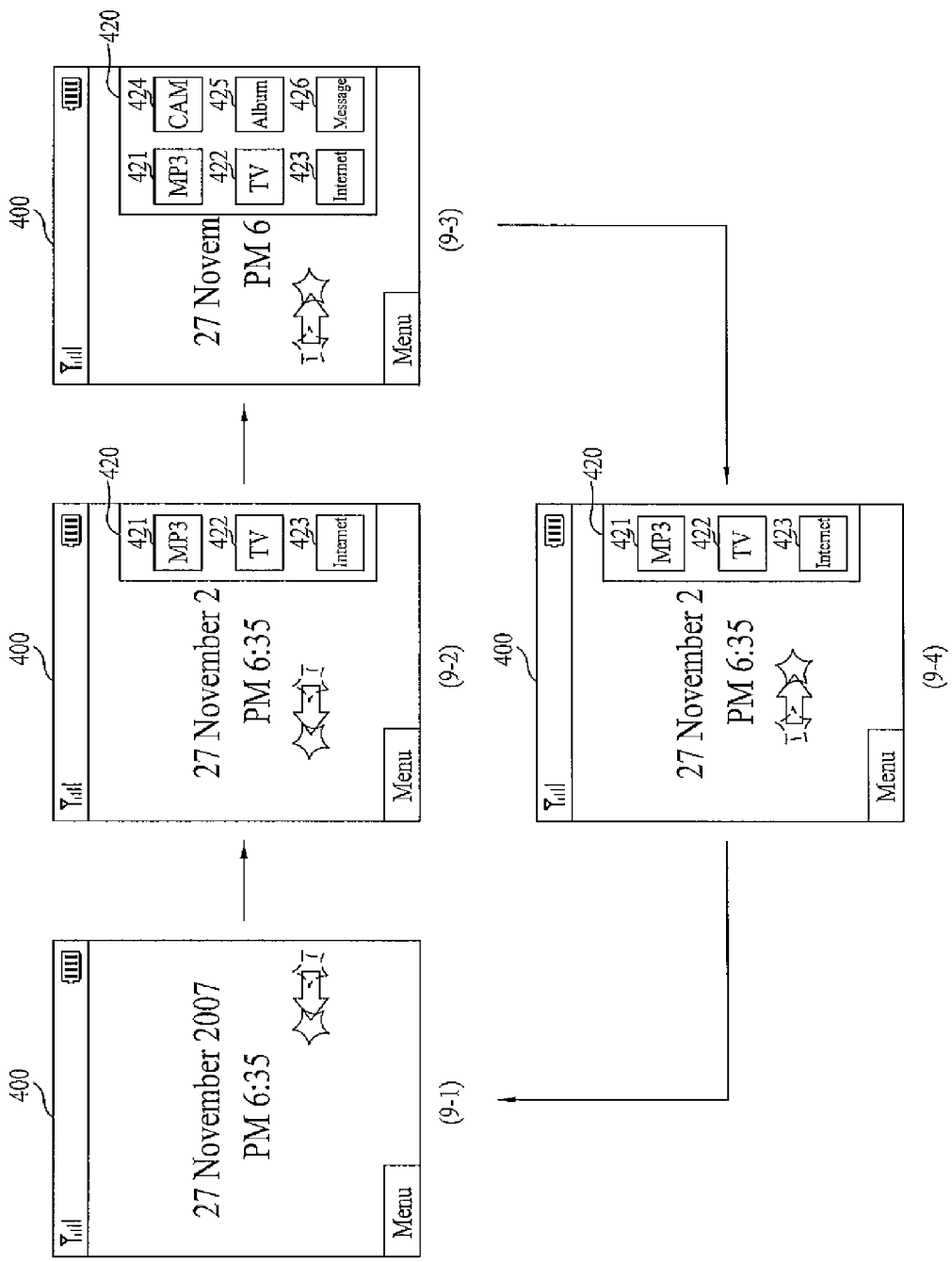
FIG. 9 is a diagram of examples of a display screen of a mobile terminal to describe an image displaying method according to a fourth embodiment of the present invention.

FIG. 9 is a diagram of examples of a display screen of a mobile terminal to describe an image displaying method according to a fourth embodiment of the present invention.

Referring to (9-1) of FIG. 9, while the touch screen 400 is in an active mode (touch mode), a prescribed point of the touch screen 400 is touch-dragged right to left.

If so, some (e.g., icons 421, 422 and 423) of a group of touch-available icons 420 existing in the outer area of the touch screen 400 beyond the right side, as shown in (9-2) of FIG. 9, pass through the boundary at the right side and then slidably appear onto the inner area on the right side of the touch screen 400.

Subsequently referring to (9-2) of FIG. 9, a prescribed point of the touch screen 400 is touch-dragged right to left one more time.

Then referring to (9-3) of FIG. 9, the rest (e.g., icons 424, 425 and 426) of the group of touch-available icons 420 existing in the outer area beyond the right side of the touch screen 400 pass through the boundary at the right side and then slidably appear onto the inner area on the right side of the touch screen 400.

Hence, a terminal user is able to select/touch and operate a specific one of the displayed touch-available icons 420 as desired.

Meanwhile, if desired, a prescribed point of the touch screen 400, as shown in (9-3) of FIG. 9, is touch-dragged left to right.

If so, the lastly displayed icons 424, 425 and 426 of the group of touch-available icons 420 on the inner area, as shown in (9-4) of FIG. 9, pass through the boundary at the right side and then slidably move into the outer area beyond the right side of the touch screen 400, whereby these icons 424, 425 and 426 disappear from the touch screen 400.

Then referring to (9-4) of FIG. 9, a prescribed point of the touch screen 400 is touch-dragged left to right one more time.

If so, some (i.e., icons 421, 422 and 423) of the group of touch-available icons 420 existing within the inner area pass through the boundary at the right side and then slidably move into the outer area beyond the right side of the touch screen 400, whereby all the icons 420 completely disappear from the touch screen 400 and the standby image may appear on the touch screen.

In the above description, some or all of the group of touch-available icons slide in to appear on the touch screen in accordance with a count (number) of the touch-drags on the touch screen. The present invention further enables a following configuration. Namely, some or all of the group of touch-available icons slide to appear on the touch screen in accordance with a length of the touch-drag on the touch screen. This is apparent to those skilled in the art. So, its details are omitted in the following description for clarity of this disclosure.

Fifth Embodiment

A method of displaying menu icons according to a fifth embodiment of the present invention is explained with reference to FIG. 10 as follows.

Figure 10:
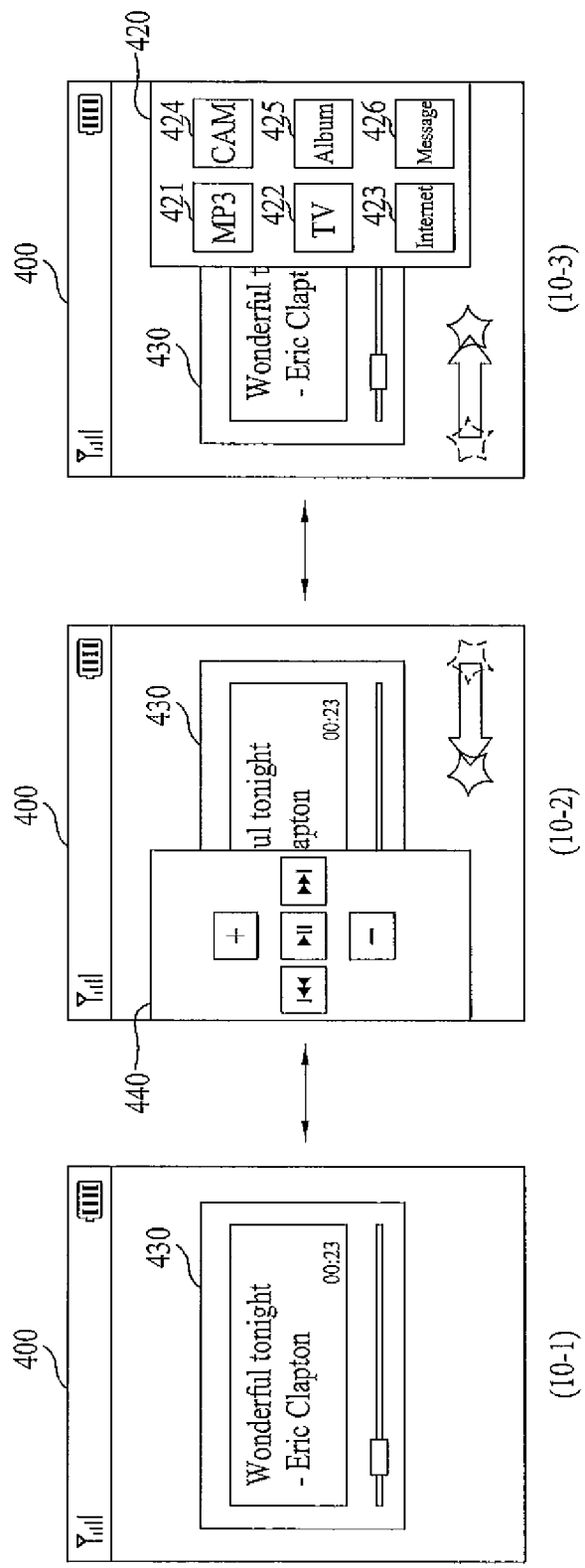
FIG. 10 is a diagram of examples of a display screen of a mobile terminal to describe an image displaying method according to a fifth embodiment of the present invention.

FIG. 10 is a diagram of examples of a display screen of a mobile terminal to describe an image displaying method according to a fifth embodiment of the present invention.

Referring to (10-1) of FIG. 10, it is assumed that an MP3 file playing function is being executed in the mobile terminal 100.

If a terminal user manipulates the touch screen activating key, the touch screen 400 is activated into the touch mode.

Referring to (10-2) of FIG. 10, a group of touch-available icons 440 relevant to the MP3 file playing function are generated and displayed on the touch screen 400. When the touch screen 400 is activated, no limitation is put on the mechanism for the group of touch-available icons 440 to appear. For example, as mentioned in the foregoing description, it is able to configure the group of touch-available icons 440 to slide to appear into the inner area from the outer area beyond the left side of the touchscreen 400.

Then referring to (10-2) of FIG. 10, a prescribed point of the touch screen 400 is touch-dragged right to left.

Then referring to (10-3) of FIG. 10, the group of touch-available icons 440 slide out to disappear into the outer area beyond the left side of the touch screen 400 from the inner area. Simultaneously, a different group of touch-available icons 420 (e.g., touch-available icons corresponding to menus frequently used by a terminal user) slide in to appear into the inner area from the outer area at the right side of the touch screen 400. For example, the icons 440 slidably disappear from the touch screen 400 and the icons 420 slidably appear onto the touch 400, at the same time, at the substantially same time, or sequentially in a particular order.

Then referring to (10-3) of FIG. 10, a prescribed point of the touch screen 400 is touch-dragged left to right.

If so, the group of touch-available icons 420, as shown in (10-3) of FIG. 10, slide to disappear into the outer area beyond the right side of the touch screen 400 from the inner area. Simultaneously, the group of the touch-available icons 440 slide to appear into the inner area from the outer area beyond the left side of the touch screen in the same manner as (10-2) of FIG. 10.

Subsequently, the terminal user deactivates the touch screen 400 by manipulating the touch screen activating key.

If so, the group of touch-available icons 440 shown in (10-2) of FIG. 10 disappear from the touch screen 400 as shown in (10-1) of FIG. 10. When the touch screen 400 is deactivated, no limitation is put on the mechanism for the group of touch-available icons 440 to disappear. For example, as mentioned in the foregoing description, it is able to configure the group of touch-available icons 440 to slide out to disappear from the inner area into the outer area beyond the left side of the touch screen 400.

In the above description, while the mobile terminal executes an MP3 file playing function, the touch screen enters the active mode. So, after the attenuation of the touch screen, a group of touch-available icons relevant to the MP3 file playing function are configured to appear in the first place. And, the present invention further enables a following configuration. Namely, while the mobile terminal is in a standby mode, if the touch screen is activated, it is able to configure a group of touch-available icons 420 corresponding to menus frequently used by the terminal user to appear in the first place.

Sixth Embodiment

A method of displaying menu icons according to a sixth embodiment of the present invention is explained with reference to FIG. 11 as follows.

FIG. 11 is a diagram of examples of a display screen of a mobile terminal to describe an image displaying method according to a sixth embodiment of the present invention.

Referring to (11-1) of FIG. 11, it is assumed that an MP3 file playing function is being executed in the mobile terminal 100. And, it is also assumed that the touch screen 400 is in an active mode.

In this case, the inner area of the touch screen 400 is partitioned into a plurality of areas. For clarity of description for the present embodiment, it is assumed that the inner area is divided into a left area I and a right area II. The left and right areas I and II are associated with a migration of touch-available icons 440 beyond the left side of the touch screen 400 and a migration of touch-available icons 420 beyond the right side of the touch screen 400, respectively. This is explained in detail as follows. However, the invention is not limited thereto and encompasses operating the touch screen divided into different areas and/or different directions (e.g., upper and lower areas).

A prescribed point on the left area I of the touch screen 400, as shown in (11-1) of FIG. 11, is touch-dragged left to right.

If so, a group of touch-available icons 440 existing in the outer area beyond the left side of the touch screen 400 pass through the boundary at the left side of the touch screen 400, as shown in (11-2) of FIG. 11, and then slide to appear into the inner area. For example, the icons 440 slidably appear on the left area I of the touch screen 400

Referring to (11-2) of FIG. 11, a prescribe point on the right area II of the touch screen 400 is touch-dragged right to left.

If so, a different group of touch-available icons 420 existing in the outer area beyond the right side of the touch screen 400, as shown in (11-3) of FIG. 11, pass through the boundary at the right side of the touch screen and then slide to appear into the inner area. That is, the icons 420 slidably appear onto the right area II of the touch screen 400.

Then referring to (11-3) of FIG. 11, a prescribed point of the left area I of the touch screen 400 is touch-dragged right to left.

If so, the group of touch-available icons 440 currently displayed, as shown in (11-4) of FIG. 11, pass through the boundary at the left side from the inner area and then slide to disappear into the outer area beyond the left side of the touch screen 400. For example, the displayed icons 440 slidably disappear from the left area I.

Referring to (11-4) of FIG. 11, a prescribed point of the right area II of the touch screen 400 is touch-dragged left to right.

If so, the different group of touch-available icons 420 currently displayed, as shown in (11-1) of FIG. 11, pass through the boundary at the right side from the inner area and then slide to disappear into the outer area beyond the right side of the touch screen. For example, the icons 420 slidably disappear from the right area II of the touch screen 400. In the above examples, touch-dragging operations are discussed in connection with specific directions (e.g., right to left, or left to right). The present invention is not limited to the examples given above, and fully encompass other directions of touch-dragging operations.

Accordingly, the present invention provides the following effects and advantages.

First of all, according to one embodiment of the present invention, a current for detecting a touch is supplied to a touch screen only if touch-available icons are displayed on the touch screen. Hence, the present invention minimizes power consumption in using the touch screen.

Secondly, according to one embodiment of the present invention, a terminal user is facilitated to display specific touch-available icons on a touch screen via a touch-drag on the touch screen. Hence, the present invention facilitates the terminal user to execute a specific menu function.

It will be apparent to those skilled in the art that various modifications and variations can be made in the present invention without departing from the spirit or scope of the inventions. For instance, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal. Thus, it is intended that the present invention covers the modifications and variations of this invention provided they come within the scope of the appended claims and their equivalents.

What is claimed is:

1. A terminal comprising:
 a wireless communication unit configured to wirelessly communicate with at least one other terminal;
 a touch screen having four sides to form a rectangular shape; and a control unit configured to control a group of touch-available icons to slidably move between outer and inner areas of the touch screen horizontally across a first one of the four sides of the touch screen in a horizontal direction of a first touch-drag on the touch screen, the group of touch-available icons following along the first touch-drag on the touch screen,
  wherein the group of touch-available icons are touch-dragged and moved to the outer area of the touch screen, such that the group of touch-available icons completely slide out of the inner area of the touch screen across the first one of the four sides thereof to disappear from the touch screen without leaving a trace for the group of touch-available icons at the first side thereof,
  wherein the control unit is further configured to:
  in response to selection of one of the touch-available icons, execute a specific function to display an execution image related to the executed specific function on the touch screen,
  receive a message while the specific function is being executed,
  display a message reception indicator indicating that the message is received,
  receive a second touch-drag in a first vertical direction on the touch screen,
  control a window for the received message to slidably appear over the execution image in the first vertical direction such that the window completely covers the execution image on the touch screen,
  receive a third touch-drag in a second vertical direction opposite to the first vertical direction on the touch screen, and
  control the window for the received message to slidably disappear to reveal the execution image in the second vertical direction.

2. The terminal of claim 1, further comprising:
a user input unit having a touch screen activating key configured to activate the touch screen,
  wherein the control unit controls the group of touch-available icons to move between the outer and inner areas of the touch screen when the touch screen is activated by the touch screen activating key.

3. The terminal of claim 1, wherein the control unit controls the group of touch-available icons to be classified into a plurality of sub groups in accordance of a type of each of the touch-available icons,
  wherein the control unit controls the touch-available icons belonging to each of the groups to correspond to at least one side of the touch screen, and
  wherein the control unit controls the touch-available icons belonging to each of the groups to move between the outer and inner areas by taking each corresponding side as a boundary.

4. The terminal of claim 3, wherein if the first touch-drag is carried out in a prescribed direction on the touch screen, the control unit controls specific touch-available icons among the touch-available icons belonging to a specific group located in the outer area beyond the side corresponding to the opposite direction, to slidably appear into the inner area using the side corresponding to the opposite direction as a boundary.

5. The terminal of claim 4, wherein if the first touch-drag is carried out in the direction opposite to the prescribed direction on the touch screen, the control unit controls the touch-available icons on the touch screen to slidably disappear into the outer area from the inner area using the side corresponding to the opposite direction as the boundary.

6. The terminal of claim 4, wherein if the specific touch-available icons belonging to the specific group are divided into first subgroup touch-available icons and second subgroup touch-available icons and if the first touch-drag is carried out in the prescribed direction on the touch screen, the control unit controls the first subgroup touch-available icons to slidably appear into the inner area using the side corresponding to the opposite direction as the boundary.

7. The terminal of claim 6, wherein if the first touch-drag is carried out on the touch screen one more time, the control unit controls the second subgroup touch-available icons to slidably appear into the inner area using the side corresponding to the opposite direction as the boundary.

8. The terminal of claim 7, wherein if the first touch-drag is carried out in the opposite direction on the touch screen, the control unit controls the second subgroup touch-available icons to slidably disappear into the outer area from the inner area using the side corresponding to the opposite direction as the boundary.

9. The terminal of claim 8, wherein if the first touch-drag is carried out one more time in the opposite direction on the touch screen, the control unit controls the first subgroup touch-available icons to slidably disappear into the outer area from the inner area using the side corresponding to the opposite direction as the boundary.

10. The terminal of claim 1, wherein there are more than two touch-available icons which are classified into a first group and a second group,
  wherein the control unit controls each of the first and second groups to move between the inner and outer areas of the touch screen by taking a corresponding one of sides of the touch screen as a boundary, and
  wherein if the first touch-drag is carried out in a first direction on the touch screen, the control unit controls the first group to slidably disappear into the outer area from the inner area using a first side corresponding to the first direction as a first boundary, and also controls the second group to slidably appear into the inner area using a second side opposite to the first side as a second boundary.

11. The terminal of claim 10, wherein the control unit is further configured to display the execution image behind the first and second groups, and render the execution image fixedly staying on the touch screen while the first group slidably disappears out of the touch screen and the second group slidably appear into the touch screen.

12. The terminal of claim 1, wherein the executed specific function is an audio play function, and
  wherein the control unit is further configured to display the execution image related to the executed audio play function in a full-screen mode, and
  control the window to slidably appear over the execution image while continuing to execute the audio play function in the background.

13. The terminal of claim 12, wherein the control unit is further configured to display a touch soft button for replying to the received incoming message.

14. The terminal of claim 1, wherein the window for received message slidably appears across a second one of the four sides of the touch screen in response to the second touch-drag.

15. A method of displaying menu icons in a terminal, the method comprising:
  providing, via a wireless communication unit of the mobile terminal, wireless communication with at least one other terminal;
  receiving, via a control unit of the mobile terminal, a touch-drag signal indicating a first touch-drag in a horizontal direction on a touch screen of the terminal, the touch screen having four sides to form a rectangular shape;

slidably moving a group of touch-available icons between outer and inner areas of the touch screen horizontally across a first one of the four sides of the touch screen in the direction of the first touch-drag, the group of touch-available icons following along the first touch-drag on the touch screen, wherein the group of touch-available icons are touch-dragged and moved to the outer area of the touch screen, such that the group of touch-available icons completely slide out the inner area of the touch screen across the first one of the four sides thereof to disappear from the touch screen without leaving a trace for the group of touch-available icons at the first side thereof;

in response to selection of one of the touch-available icons, executing a specific function to display an execution image related to the executed specific function on the touch screen;

receiving a message while the specific function is being executed;

displaying a message reception indicator indicating that the message is received;

receiving a second touch-drag in a first vertical direction on the touch screen;

controlling a window for the received message to slidably appear over the execution image in the first vertical direction such that the window completely covers the execution image on the touch screen;

receiving a third touch-drag in a second vertical direction opposite to the first vertical direction on the touch screen; and controlling the window for the received message to slidably disappear to reveal the execution image in the second vertical direction.

16. The method of claim 15, further comprising:
selectively activating the touch screen using a touch screen activation key; and
moving the group of touch-available icons between the outer and inner areas of the touch screen after the touch screen is activated.

17. The method of claim 15, wherein the group of touch-available icons are classified into a plurality of sub groups in accordance of a type of each of the touch-available icons,
wherein the touch-available icons belonging to each of the groups corresponds to at least one of sides of the touch screen, and
wherein in the moving step, the touch-available icons belonging to each of the groups are moved between the outer and inner areas by taking each corresponding side as a boundary.

18. The method of claim 17, wherein if the first touch-drag is carried out in the prescribed direction on the touch screen, specific touch-available icons among the touch-available icons belonging to a specific group located in the outer area beyond the side corresponding to the opposite direction slidably appear into the inner area using the side corresponding to the opposite direction as a boundary.

19. The method of claim 18, wherein if the first touch-drag is carried out in the direction opposite to the prescribed direction on the touch screen, the touch-available icons on the touch screen slidably disappear into the outer area from the inner area using the side corresponding to the opposite direction as the boundary.

20. The method of claim 18, wherein if the specific touch-available icons belonging to the specific group are divided into first subgroup touch-available icons and second subgroup touch-available icons and if the first touch-drag is carried out in the prescribed direction on the touch screen, the first subgroup touch-available icons slidably appear into the inner area using the side corresponding to the opposite direction as the boundary.

21. The method of claim 20, wherein if the first touch-drag is carried out on the touch screen one more time, the second subgroup touch-available icons slidably appear into the inner area using the side corresponding to the opposite direction as the boundary.

22. The method of claim 21, wherein if the first touch-drag is carried out in the opposite direction on the touch screen, the second subgroup touch-available icons slidably disappear into the outer area from the inner area using the side corresponding to the opposite direction as the boundary.

23. The method of claim 22, wherein if the first touch-drag is carried out one more time in the opposite direction on the touch screen, the first subgroup touch-available icons slidably disappear into the outer area from the inner area using the side corresponding to the opposite direction as the boundary.

24. The method of claim 15, wherein there are more than two touch-available icons which are classified into a first group and a second group,
wherein each of the first and second groups moves between the inner and outer areas of the touch screen by taking a corresponding one of sides of the touch screen as a boundary, and
wherein if the first touch-drag is carried out in a first direction on the touch screen, the first group slidably disappears into the outer area from the inner area using a first side corresponding to the first direction as a first boundary, and the second group slidably appears into the inner area using a second side opposite to the first side as a second boundary.

25. The method of claim 24, wherein the execution image is displayed behind the first and second groups, and the execution image fixedly stays on the touch screen while the first group slidably disappears out of the touch screen and the second group slidably appear into the touch screen.

26. The method of claim 15, wherein the executed specific function is an audio play function, and
wherein the method further comprises:
displaying the execution image related to the executed audio play function in a full-screen mode; and
controlling the window to slidably appear over the execution image while continuing to execute the audio play function in the background.

27. The method of claim 26, further comprising:
displaying a touch soft button for replying to the received incoming message.

28. The method of claim 15, wherein the window for received message slidably appears across a second one of the four sides of the touch screen in response to the second touch-drag.

* * * * *